(12) United States Patent
Chang et al.

(10) Patent No.: US 6,853,166 B1
(45) Date of Patent: Feb. 8, 2005

(54) CAPACITANCE CHARGE DEVICE WITH ADJUSTABLE CLAMPING VOLTAGE

(75) Inventors: Yuan-Wen Chang, Hsinchu (TW); Yi-Shan Chu, Jhubei (TW)

(73) Assignee: Altek Corp., Hsinchu (TW)

( * ) Notice: Subject to any disclaimer, the term of this patent is extended or adjusted under 35 U.S.C. 154(b) by 8 days.

(21) Appl. No.: 10/644,837

(22) Filed: Aug. 21, 2003

(51) Int. Cl.$^7$ ............................................... H02J 7/16
(52) U.S. Cl. ........................................................ 320/167
(58) Field of Search ............................. 320/167, 166; 363/37, 363

(56) References Cited

U.S. PATENT DOCUMENTS 5,412,557 A * 5/1995 Lauw .......................... 363/37
5,852,558 A * 12/1998 Julian et al. ................. 363/132

* cited by examiner

*Primary Examiner*—Pia Tibbits
(74) *Attorney, Agent, or Firm*—Rosenberg, Klein & Lee

(57) ABSTRACT

A capacitance charge device with adjustable clamping voltage is disclosed in the invention, which includes a high-farad capacitance and a power supply device for charging to the high-farad capacitance. In addition, a switch device is connected between the power supply device and the capacitance, and through the on/off operations of the switch device, the on/off conductions between the power supply device and the capacitance can be controlled. Besides, a clamping circuit is connected between the switch device and the capacitance and also connected to the output terminal of the power supply device. In addition, the clamping circuit has a clamping voltage, which can be compared with the actual voltage so as to control the on/off operations of the switch device and in turn control the on/off conductions between the power supply device and the capacitance. In addition, the invention can constrain the battery voltage in the clamping voltage of the clamping circuit. By doing so, the system can be ensured not to be down because of a sudden tremendous voltage drop of the battery, and the clamping voltage is adjustable according to the variations in product design.

9 Claims, 5 Drawing Sheets

CAPACITANCE CHARGE DEVICE WITH ADJUSTABLE CLAMPING VOLTAGE

BACKGROUND OF THE INVENTION

1. Field of the Invention

The invention relates to a capacitance charge device that is applied to a power system of a portable electronic product and, more particularly, to a capacitance charge device with adjustable clamping voltage capable of clamping the battery voltage so that the voltage will not have a tremendous drop instantaneously when the battery is charging the high-farad capacitance.

2. Description of the Related Art

With development of the information industry, many portable electronic products, such as a mobile phone, notebook computer, personal digital assistance (PDA), and digital camera, have been applied in daily life for different purposes such as video/audio multimedia communications and information network transmissions.

On the other hand, low working voltage has been a developing trend pursued by electronic products. Usually, a battery 10, as shown in FIG. 1, will be connected in series to a high-capacity capacitance 12 in a power system to prolong a battery's lifespan. The capacity of the capacitance 12 often lies between 1 and 10 farad. When the capacity of the capacitance 12 is at zero, the battery 10 will rapidly charge the high-farad capacitance 12 instantaneously and therefore cause the voltage of battery 10 to drop in large amount. In turn, the dropping of the voltage will affect not only the lifespan of the battery, but also the normal running of the system, and if the system is down, the electronic product will fail to function normally.

To cope with the problem, as shown in FIG. 2, a conventional solution is to add in a current limiting resistor connected in series between the battery 10 and the capacitance 12 in order that the resistor 14 can refrain the battery 10 from rapid discharging and thus improve the problem of the battery's tremendous voltage drop. Nevertheless, the lifespan of the battery 10 will still be affected by the natural consumption of the resistor 14.

Therefore, the invention provides a capacitance charge device with adjustable clamping voltage to solve the above-mentioned problems.

SUMMARY OF THE INVENTION

The main and first object of the invention is to provide a capacitance charge device with adjustable clamping voltage capable of clamping the battery voltage so that the battery voltage will not have a tremendous drop instantaneously when the battery is charging the high-farad capacitance so as to prevent the system from being down as well as to ensure the normal functioning of the electronic product.

The second object of the invention is to provide a capacitance charge device that its clamping voltage is adjustable according to the variations in product design.

The third object of the invention is to provide a capacitance charge device with adjustable clamping voltage capable of prolonging the lifespan of a battery.

The fourth object of the invention is to provide a capacitance charge device with adjustable clamping voltage suitable for any kind of battery designed for charging the high-farad capacitance.

According to the invention, a capacitance charge device with adjustable clamping voltage includes a high-farad capacitance; a power supply device for charging the high-farad capacitance; a switch device connected between the power supply device and the high-farad capacitance in order that through the on/off operations of the switch, the on/off conductions between the power supply device and the high-farad capacitance can be controlled; and a clamping circuit provided between the switch device and the high-farad capacitance and also connected to the output terminal of the power supply device; besides, the clamping circuit has a clamping voltage, which can be compared with the actual voltage so as to control the on/off operations of the switch device and in turn control the on/off conductions between the power supply device and the capacitance.

The objects and technical contents of the invention will be better understood through the description of the following embodiments with reference to the drawings.

DETAILED DESCRIPTION OF THE PREFERRED EMBODIMENTS

The invention utilizes a Zener Diode that its voltage is able to keep a constant value in spite of sharp current change when the Zener Diode is encountering a breakdown during a reverse bias operation. Next, a clamping circuit is formed in accordance with other components such as resistors and transistors so as to achieve an effect of clamping the battery voltage. Therefore, the voltage can avoid from dropping too drastically and therefore resulting in system down. Hence, the electronic product can be ensured to function normally.

Figure 1:
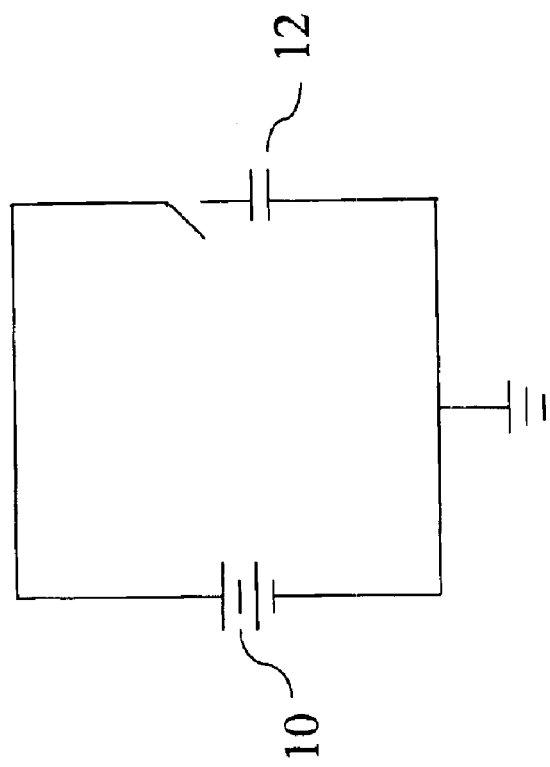
FIG. 1 is a schematic diagram showing circuit design of a conventional capacitance charge device.
Figure 2:
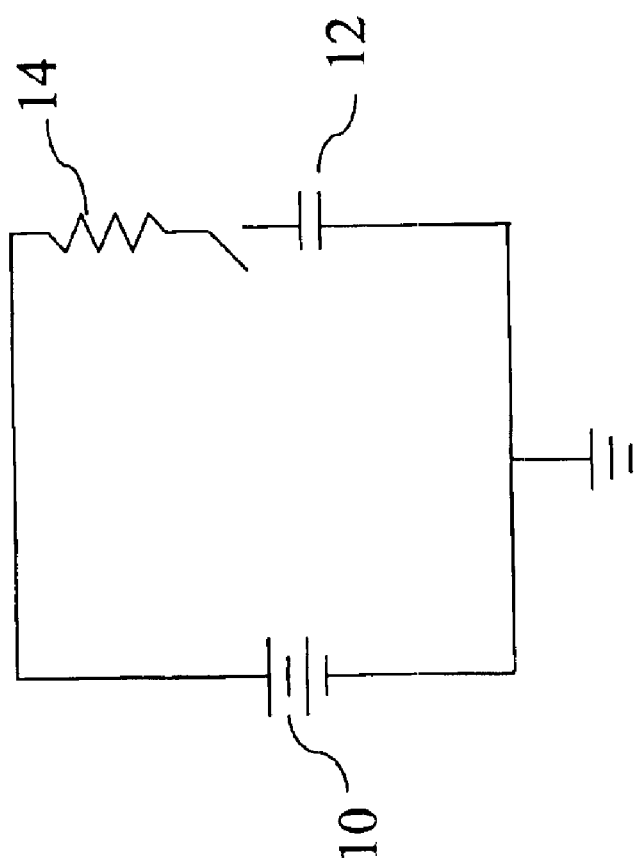
FIG. 2 is a schematic diagram showing another circuit design of a conventional capacitance charge device.
Figure 3:
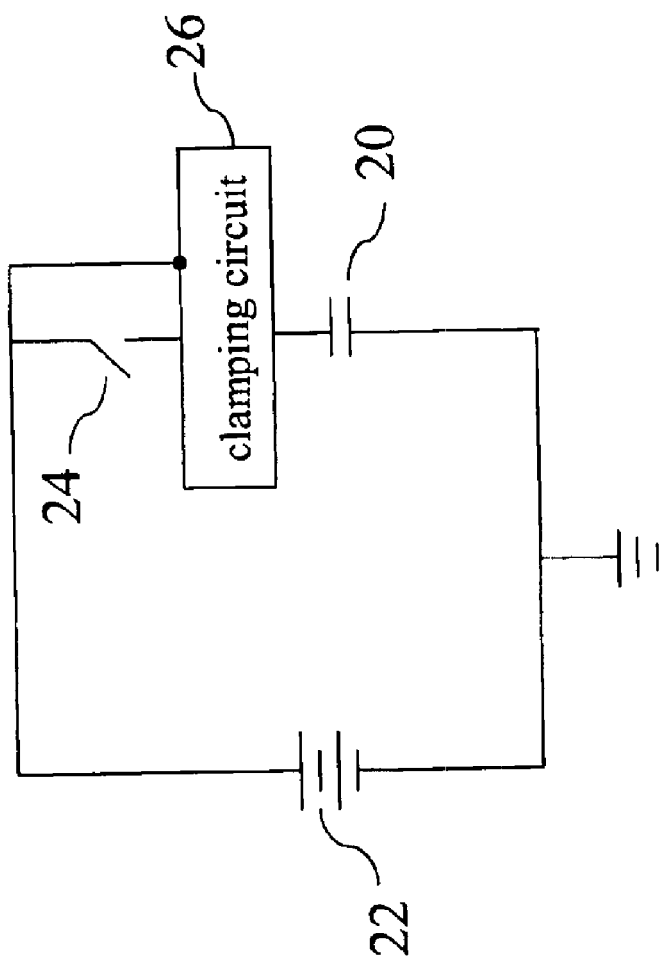
FIG. 3 is a schematic diagram showing circuit design of the capacitance charge device of the invention.

FIG. 3 is a schematic diagram showing circuit design of the capacitance charge device of the invention. As shown in FIG. 3, the capacitance charge device of the invention firstly includes a high-farad capacitance 20, whose capacity usually lies between 1 and 10 farad, and a power supply device that is usually a battery 22 connected to the capacitance 20 for charging the high-farad capacitance 20. Secondly, a switch device 24 is connected between the battery 22 and the capacitance 20, and through on/off operations of the switch, the on/off conductions between the battery 22 and the capacitance 20 can be controlled. Thirdly, a clamping circuit 26 is connected between the switch device 24 and the capacitance 20, and the clamping circuit 26 is also connected to the output terminal of the battery 22. Besides, the clamping circuit 26 has a clamping voltage, which is also referred as a reference voltage and can be compared with the actual voltage so as to control the on/off operations of the switch device 24 for facilitating the control of on/off conductions between the battery 22 and the capacitance 20. In addition, the clamping voltage is adjustable according to the variations in product design, and usually it has at least 1.8 volts. When the actual voltage is higher than the clamping voltage, the switch device 24 controlled by the clamping circuit 26 will be opened, allowing the battery 22 and the capacitance 20 to be conductive for a charge from the battery 22 to the capacitance 20. Conversely, when the actual voltage is lower than the clamping voltage, the switch device 24 controlled by the clamping circuit 26 will be closed for turning off the conduction between the battery 22 and the capacitance 20.

Figure 4:
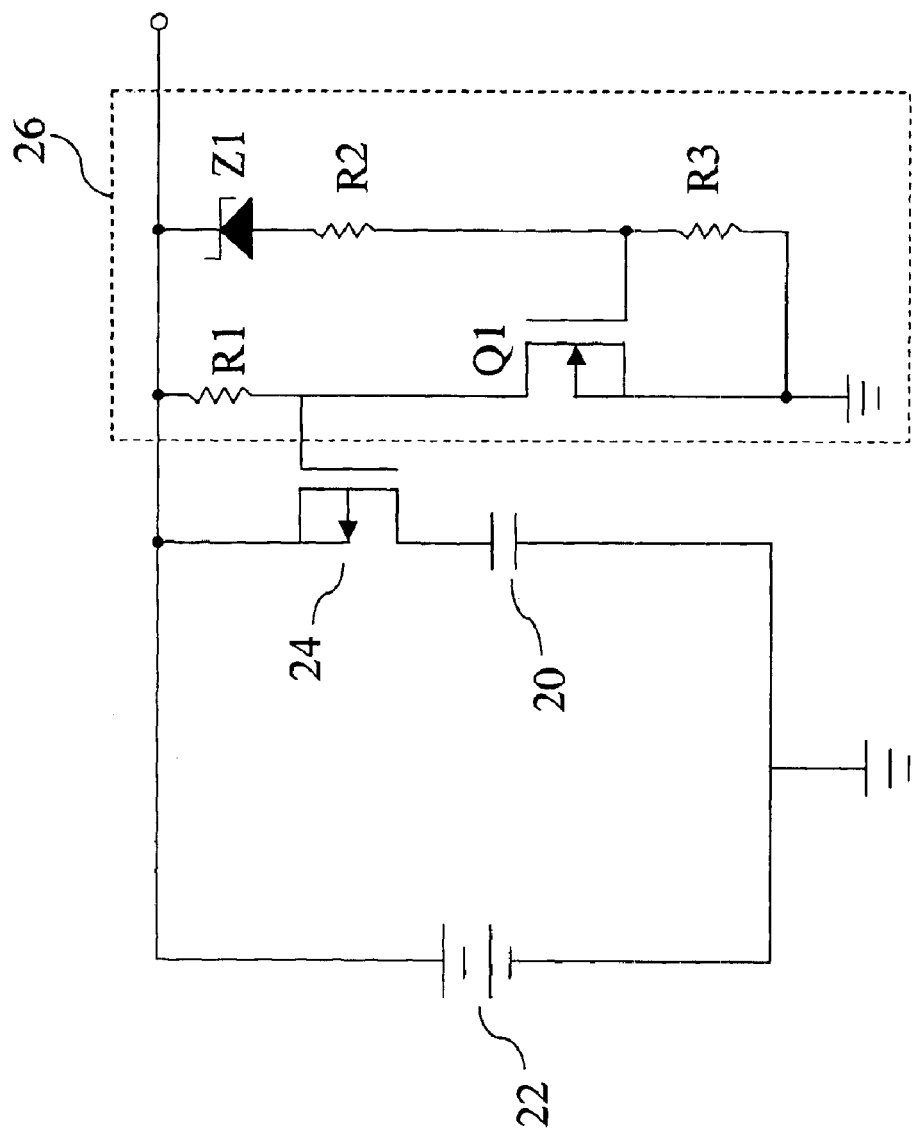
FIG. 4 and FIG. 5 are schematic diagrams showing two different embodiments of application circuit designs of the capacitance charge device of the invention.
Figure 5:
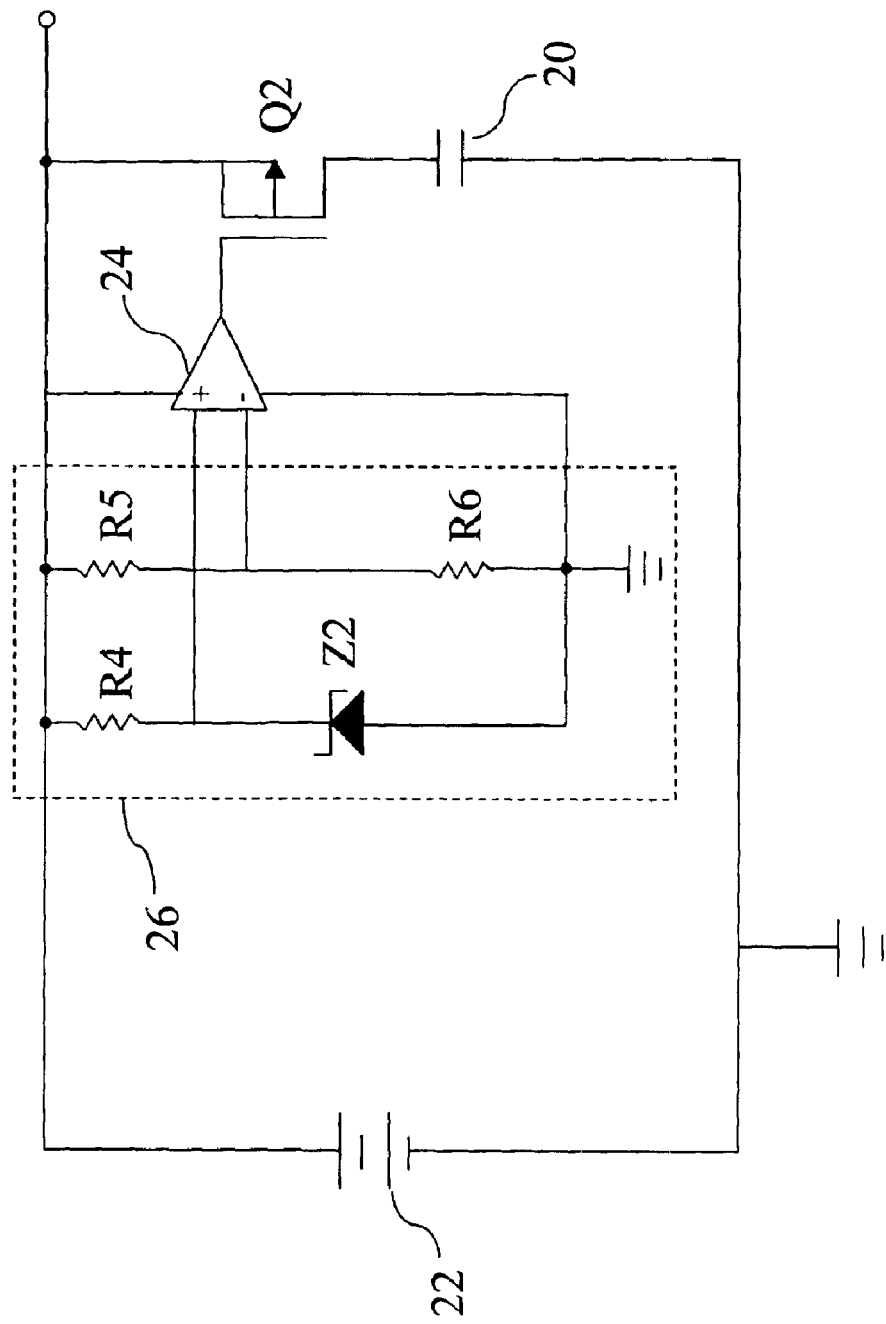

To illustrate the relation between the clamping circuit 26 and the battery 22, two embodiments are shown in FIG. 4 and FIG. 5 for illustrating two different application circuit designs of the invention as well as for the function of the clamping circuit 26. First, as shown in FIG. 4, the switch device 24 in this embodiment is a transistor, and the clamping circuit 26 is composed of a Zener Diode Z1, a transistor Q1, and resistors R1, R2, and R3.

When the capacity of the capacitance 20 is at zero, the battery 22 will charge the capacitance 20; consequently, the voltage of the battery 22 will go down. During the initial charging process, the actual voltage will be higher than the clamping voltage provided by the clamping circuit 26 since the battery 22 is still at its beginning stage of discharge. Therefore, the clamping circuit 26 will maintain the control of the switch device 24 to be open, allowing conduction between the battery 22 and the capacitance 20 for a charging operation. On the contrary, if the actual voltage is lower than the clamping voltage, the Zener Diode will become conductive due to breakdown, allowing the switch device 24 to be closed and conduction between the battery 22 and the capacitance 20 to be turned off. Therefore, the electric potential of the battery 22 will no longer go down. Afterwards, when the actual voltage is running up again until it is higher than the clamping voltage, the switch device 24 will then be opened again, allowing the battery 22 and the capacitance 20 to be conductive for charging operation between the two. As a result, through the aforementioned clamping operation, the clamping circuit 26 will constrain the electric potential of the battery 22 in the clamping voltage and thus the confined voltage will not have a tremendous drop instantaneously. In turn, the dropping of the electric potential of the battery 22 will not be effective enough to shutdown the system. Therefore, the electronic product can be assured to function normally and the lifespan of the battery 22 can be prolonged as well.

Furthermore, FIG. 5 is another embodiment showing another application circuit design of the invention. In this embodiment, the switch device 24 is a comparator, and a transistor Q2 functioning as a switch is connected between the output terminal of the comparator and the capacitance 20. Besides, the clamping circuit 26 is composed of a Zener Diode Z2 and resistors R4, R5, and R6. As for the clamping operation, since the principle and method of the clamping operation between the clamping circuit 26 and the battery 22 are the same as those of described in the FIG. 4, they will not be reiterated here.

Thus, the capacitance charge device with adjustable clamping voltage provided by the invention can be applied to the power system of a portable electronic product, such as a digital camera, mobile phone, notebook computer, or personal digital assistance.

In conclusion, the invention utilizes a clamping circuit whose main component is Zener Diode for charging a high-farad capacitance. During the charging process, the battery voltage will not have a tremendous drop instantaneously when the battery is charging the high-farad capacitance. Therefore, the invention can achieve clamping the battery voltage so as to prevent the system from being down instantaneously as well as to ensure normal functioning of the electronic product. Meanwhile, the lifespan of the battery can be prolonged as well. Moreover, the clamping voltage is adjustable according to various designs of electronic products. Therefore, the capacitance charge device provided by the invention has the advantage of being suitable for any kind of battery designed for charging the high-farad capacitance.

The description above intends to explain the features of this invention by an implementation example. The purpose is to let persons skilled in the art can understand the contents of this invention and implement by it. However, this does not mean to limit the claims of this invention. Therefore, all equivalent substitutions and modifications are intended to be embraced within on as defined in the appended claims.

What is claimed is:

1. A capacitance charge device with adjustable clamping voltage, including:

a high-farad capacitance;

a power supply device, for charging the high-farad capacitance;

a switch device, connected to the power supply device and the high-farad capacitance for controlling the on/off conductions between the power supply device and the high-farad capacitance through the on/off switch operations; and a clamping circuit, connected between the switch device and the high-farad capacitance and also connected to the output terminal of the power supply device; and the clamping circuit responds to a clamping voltage that can be compared with an actual voltages so as to control the on/off operations of the switch device and in turn control the on/off conductions between the power supply device and the capacitance.

2. The capacitance charge device with adjustable clamping voltage as claimed in claim 1, wherein the power supply device is a battery.

3. The capacitance charge device with adjustable clamping voltage as claimed in claim 1, wherein the switch device is a transistor.

4. The capacitance charge device with adjustable clamping voltage as claimed in claim 1, wherein the switch device is a comparator.

5. The capacitance charge device with adjustable clamping voltage as claimed in claim 1, wherein the clamping circuit is composed of a Zener Diode, at least one transistor, and a plurality of resistors.

6. The capacitance charge device with adjustable clamping voltage as claimed in claim 1, wherein the clamping circuit is composed of a Zener Diode and a plurality of resistors.

7. The capacitance charge device with adjustable clamping voltage as claimed in claim 1, wherein the clamping voltage is at least 1.8 volt.

8. The, capacitance charge device with adjustable clamping voltage as claimed in claim 1, wherein when the actual voltage is lower than the clamping voltage, the switch device controlled by the clamping circuit will be closed for turning off the conduction between the power supply device and the high-farad capacitance and for clamping the electric potential of the power supply device.

9. The capacitance charge device with adjustable clamping voltage as claimed in claim 1, wherein when the actual voltage is higher than the clamping voltage, the switch device controlled by the clamping circuit will be opened for turning on the conduction between the power supply device and the high-farad capacitance so that the power supply device can charge to the high-farad capacitance.

* * * * *